UNITED STATES PATENT OFFICE.

CARLETON ELLIS AND ALFRED A. WELLS, OF MONTCLAIR, NEW JERSEY, ASSIGNORS, BY MESNE ASSIGNMENTS, TO NATIONAL CARBON COMPANY, INC., OF CLEVELAND, OHIO, A CORPORATION OF NEW YORK.

PROCESS OF MAKING CONDUCTING HYDRATED BLACK MANGANESE DIOXID.

1,330,738.     Specification of Letters Patent.     Patented Feb. 10, 1920.

No Drawing.     Application filed September 26, 1916. Serial No. 122,194.

*To all whom it may concern:*

Be it known that we, CARLETON ELLIS and ALFRED A. WELLS, citizens of the United States, residing at Montclair, in the county of Essex and State of New Jersey, have invented certain new and useful Improvements in Processes of Making Conducting Hydrated Black Manganese Dioxid, of which the following is a specification.

This invention relates to a method of making hydrated manganese dioxid depolarizing material suitable for various chemical operations and particularly adapted for use as a depolarizing agent for batteries of the Leclanché type, especially miniature cells which require a very high degree of depolarizing activity for successful use.

The invention specifically relates to a method of making a hydrated manganese dioxid depolarizing body which is black in color, preferably of a deep black shade and which has good conducting qualities, so that its presence in a depolarizing mixture containing graphite may not greatly diminish or modify the conductivity thereof under approved conditions.

The invention further relates to the production of such depolarizing material of good quality and in good yield from a cheap salt of manganese such as manganese sulfate by controlled oxidation under certain conditions of operation employing an oxidizing agent such for example as sodium chlorate, or preferably hypochlorite. If alkali hypochlorite solution is allowed to act on manganese sulfate in a neutral or alkaline solution a brownish precipitate is eventually obtained which apparently contains some dioxid mingled with other products. If the reaction is allowed to take place in acid solution, especially if the acidity is relatively low but nevertheless exceeds a certain fairly weak concentration, the black product is obtained and in good yield particularly when employing a temperature at or above the boiling point of water.

If the hypochlorite in boiling solution of acid reaction exceeding a certain strength is allowed to act on the sulfate, a small amount of deep black good conducting hydrated manganese dioxid forms, but the rate of formation is greatly retarded or prevented entirely and the yield if any is very small. A large amount of manganese remains in solution. The formation of the dioxid is retarded by the presence of excessive amounts of free acid and after reaching a certain concentration the acid tends to prevent any further formation of the dioxid. The action is apparently controlled by the concentration of the hydrogen ions in the solution, as much larger quantities of a weak acid such as acetic acid and the like are required than is the case with strong acids such as sulfuric. If the solution is alkaline a brown product is obtained instead of the deep black material.

The selection of acid for acidifying such solution should be made with reference to the manganese salt employed and also with respect to compatibility of the material so mixed. For example, phosphoric acid under certain conditions forms a precipitate containing manganese phosphate. Nitric and hydrochloric acids, generally speaking, require a greater concentration than sulfuric acid and the latter acid is preferred for carrying out the invention involved herein, especially when using the sulfate of manganese.

In using the sulfuric acid a strength of approximately one and one-half per cent. is best suited for the production of deep black good conducting hydrated manganese dioxid. As the strength of the acid increases the solution may be kept in the requisite stage of slight acidity by the addition from time to time of small amounts of sodium carbonate solution or other adjusting reagent capable of modifying the degree of acidity so as to maintain the solution slightly acid in character, but not sufficiently acid to stop the progress of reaction.

An illustrative example is the following:—

A solution of manganous sulfate was heated and to it was added in small portions from time to time, while heating to boiling point, a solution of sodium hypochlorite which had been prepared by passing chlorin into caustic soda solution until the alkalinity was neutralized. Sodium carbonate solution was added at intervals to keep the reaction mass only slightly acid during the oxidization stage. Care was taken to keep the solution acid to a slight degree. The manganese sulfate was thus substantially completely converted into the deep black good conducting hydrate of higher oxid of manganese.

Ordinarily when the concentration reaches about ten or eleven per cent. of acid the reaction is brought to a standstill, and somewhat lower concentrations tend to considerably retard the reaction. Concentrations of from about one or one and one-half to three or four per cent. preferably should be employed. It is possible, also, to operate with concentrations of the reagents, which enable the reaction to take place in a fairly complete manner without the necessity of adding the neutralizing agent during the operation. When such a neutralizing agent, as for example, sodium carbonate is introduced, little by little, it has been found difficult to make the additions in such a way that brown manganese dioxid is not at times formed, owing to local alkalinity in this mixture. The brown dioxid or partially oxidized material of this character when once formed in such a solution is not easily converted to the black form.

When using manganese chlorid instead of the sulfate the hydrochloric acid being volatile tends to keep the solution below the requisite degree of acidity when the solution is kept at the boiling point and a brown precipitate is likely to form. In this case the adjusting reagent is of an acid instead of an alkaline character. The addition of hydrochloric acid under these conditions is necessary from time to time in order to maintain the conditions for the formation of the deep black product. At lower temperatures less acid is added or none at all. Thus the invention involves the adjustment of the degree of acidity according to the initial conditions and this may require the addition of an alkali or other base or in special cases of an acid and such additions may take place progressively from time to time to maintain the required acid strength.

Manganese carbonate preferably freshly precipitated may be used in the place of sodium carbonate to take care of the excess of sulfuric acid in the case of the use of manganese sulfate.

To accelerate the rate of formation of the manganese dioxid it is desirable to work with moderately concentrated solutions and manganese sulfate solutions containing approximately fifteen per cent. of hydrated manganese sulfate ($MnSO_4.4H_2O$) may be used. The hypochlorite strength of the stock solution may be decreased and the manganese sulfate strength increased, or, vice versa, keeping the percentages of each fixed for use in one case approximately as follows:—

Manganese sulfate.............................. 8.5%
Sodium hypochlorite............................ 14.5%
Water—about................................... 75% and the acidity as stated should preferably range between one and one-half and three or four per cent.

The following tabulation indicates the parts by weight of reagents per unit by weight of the manganese dioxid to use in the preparation of the latter material:—

$MnSO_4.4H_2O$ .............................. 2 parts by weight
Caustic soda (for hypochlorite) .............. 3.5 " " "
Water ....................................... 18.5 " " "
Sulfuric acid ............................... 0.5 " " "

The manganese sulfate salt containing four molecules of water of crystallization may be conveniently put into the form of a stock solution of thirty to forty per cent. strength, or a solution containing thirty to forty parts of $MnSO_4$ to one hundred parts of water may be found convenient in some cases. The second item in the table is expressed as caustic soda 3.5 parts because that amount of caustic soda is used to prepare the hypochlorite material used to treat two parts of the hydrated manganese sulfate. It is stated in this form as giving a more definite composition than when expressed in terms of hypochlorite material. A solution of thirty parts of caustic soda in one hundred parts of water is a convenient solution to use for this purpose. It is preferably chlorinated approximately to neutrality and if chlorate is formed during the operation some allowance may be made for the formation of this material. It will be noted that in this case an excess of hypochlorite is used over the theoretical amount required. The 18.5 parts of water expressed in the above table may come from various sources as from the manganese sulfate solution, the hypochlorite solution or from dilute sulfuric acid and the mixing should be carried out to afford a concentration expressed by this amount of water when the operation is carried on under preferred conditions. Any manganese sulfate not converted into manganese dioxid may be recovered and retreated under these conditions. The foregoing proportions are merely illustrative as will be evident from matter set forth elsewhere herein, and various modifications may be carried out hereunder in accordance with the terms hereof.

In the preparation of the hypochlorite solution the procedure may be as follows:—

A thirty per cent. solution of caustic soda is treated with chlorin gas until completely neutralized which may be shown by adding a small quantity to a cold solution of manganese sulfate when a brown precipitate is formed immediately if free alkali exists but no precipitate forms at once in the cold when the latter has been completely neutralized.

In mixing the reagents especially when hot solutions are employed, the acid should be added to the manganese sulfate solution before the addition of the hypochlorite solution and preferably the entire quantity of hypochlorite reagent is added at once, although if desired the latter may be added in small portions over a period of time.

The reaction takes place best at temperatures above the boiling point of water. With the strength of solutions indicated a boiling temperature of about 103° C., exists. Some latitude is possible in the variation of temperature but preferably temperatures at or near the boiling point of water are employed.

In a similar manner other salts of manganese such as the chlorid, nitrate and the like may be oxidized in the manner aforesaid employing sulfuric or other compatible acid as an acidity controlling reagent.

The product should be well washed to remove soluble salts as even traces of these oftentimes cause undesirable side reactions. It is desirable to free the product from such saline or other material to such an extent that when a small quantity (1 or 2%) of the finished product is placed in distilled water and agitated thoroughly the conductivity of the water is not materially changed.

The final product in its preferred form is of a deep black color, is well hydrated and does not part with its water of hydration readily, even when heated quite strongly. It conducts an electric current readily, hence is eminently suited for use in dry batteries as a depolarizer where its conducting properties are beneficial. Slight modifications in temperature and degree of acidity cause slight changes in the tone of the resulting dioxid and shades ranging from a brownish-black to an ashy gray black may be obtained through such variation but by using the proportions specified above a deep black product of a desirable character is secured.

What we claim is:—

1. The process of making black conducting hydrated manganese dioxid which comprises subjecting a manganese salt in a slightly acid solution of a mineral acid to the oxidizing action of a reactive hypochlorite compound at a temperature above the boiling point of water whereby a product adapted for use as a depolarizing agent is derived.

2. The process of making black conducting hydrated manganese dioxid which comprises subjecting manganese sulfate in aqueous solution containing a few per cent. of a fixed mineral acid to the oxidizing action of a solution of neutral sodium hypochlorite and in maintaining the temperature at or above the boiling point of water during the oxidizing period whereby a product adapted for use as a depolarizing agent is derived.

3. In the process of making a black conducting hydrated manganese dioxid for depolarizing purposes, the step which consists in treating a hot solution containing a soluble manganese salt with a solution of a reactive hypochlorite compound in the presence of sulfuric acid but not exceeding a degree of acidity capable of substantially or completely hindering the reaction of formation of the dioxid; whereby a product adapted for use as a depolarizing agent is derived.

4. The process of making hydrated manganese dioxid of a black color which comprises subjecting a soluble manganese salt in a solution containing more than 1% but not exceeding about 10% of sulfuric acid to the oxidizing action of a reactive hypochlorite compound and in collecting the dioxid material thereby formed.

5. The process of making black conducting hydrated manganese dioxid depolarizing material which comprises acidifying a solution of manganese sulfate with sulfuric acid to furnish an acidity ranging between about one and one-half to approximately ten per cent. in adding sodium hypochlorite material to such solution and in maintaining the temperature sufficiently high to cause rapid formation of black manganese dioxid.

6. The process of making black conducting hydrated manganese dioxid depolarizing material which comprises oxidizing manganese sulfate with sodium hypochlorite in a solution of approximately a one and one-half per cent. acidity.

7. The process of making black conducting hydrated manganese dioxid which comprises oxidizing a manganese salt with sodium hypochlorite material in an acid solution not exceeding a few per cent. of acidity whereby a product adapted for use as a depolarizing agent is derived.

8. The process of making black conducting hydrated manganese dioxid which comprises subjecting a manganese salt in slightly acid solution of a fixed mineral acid, maintained near the boiling point to the oxidizing action of a reactive hypochlorite compound and in adjusting the strength of acid from time to time to prevent an excessive degree of acidity whereby the deep black product is formed in substantially quantitative yield.

9. The process of making black conducting hydrated manganese dioxid which comprises subjecting a manganese salt in an acid solution of sulfuric acid maintained near the boiling point to the oxidizing action of a reactive hypochlorite compound and in maintaining the acidity between about one and one-half and ten per cent. during the reaction whereby a product adapted for use as a depolarizing agent is derived.

10. The process of making deep black good conducting hydrated manganese dioxid which comprises subjecting manganese sulfate in a boiling slightly acid solution to the oxidizing action of a reactive hypochlorite compound and in maintaining a slight degree of acidity during the reaction whereby a product adapted for use as a depolarizing agent is derived.

11. In the process of making black conducting hydrated manganese dioxid depolarizing material, the step which comprises maintaining a solution in which a manganese salt is being oxidized at an acid strength of about one and one-half per cent., whereby a product adapted for use as a depolarizing agent is derived.

12. The process of making black conducting hydrated manganese dioxid which comprises subjecting a manganese salt in slightly acid solution to the oxidizing action of a reactive hypochlorite compound and in progressively neutralizing the excess of acid to maintain a slight degree of acidity whereby the black product is formed in substantially quantitative yield.

13. The process of making deep black good conducting hydrated manganese dioxid which comprises subjecting manganese sulfate in slightly acid solution to the oxidizing action of a reactive hypochlorite compound and in progressively neutralizing the excess of acid to maintain a slight degree of acidity whereby the black product is formed in substantially quantitative yield.

14. In the process of making black conducting hydrated manganese dioxid the step which comprises treating a hot solution in which a manganese salt is being oxidized and free acid is thereby being liberated, with a neutralizing agent, whereby the solution is maintained slightly acid in character and the presence of a degree of acidity sufficient to check the progress of the reaction is precluded.

15. In the process of making black conducting hydrated manganese dioxid the step which comprises treating a solution in which manganese sulfate is being oxidized and sulfuric acid is thereby being liberated, with a neutralizing agent; whereby the solution is maintained slightly acid in character but not sufficiently acid to check the progress of the reaction.

16. In the process of making black conducting hydrated manganese dioxid the step which comprises subjecting a solution in which a soluble manganese salt is being oxidized to the action of an adjusting reagent capable of modifying the degree of acidity so as to maintain the solution slightly acid in character but not sufficiently acid to check the progress of the reaction.

17. The process of making a black conducting hydrated manganese dioxid for the purpose and with the result of yielding a product adapted to the requirements of a commercial depolarizing material, which comprises treating a relatively concentrated solution of a compound of manganese of a lower stage of oxidization with a hypochlorite oxidizing agent, the reaction being carried on in an acid medium.

In testimony whereof we have affixed our signatures.

CARLETON ELLIS.
ALFRED A. WELLS